May 15, 1956     M. TURCHAN     2,745,624
THREE DIMENSION TRACER
Filed Feb. 25, 1953     3 Sheets-Sheet 1

INVENTOR.
MANUEL TURCHAN.
BY
Robert A. Sloman
ATTORNEY.

INVENTOR.
MANUEL TURCHAN.
BY
Robert A. Sloman
ATTORNEY.

May 15, 1956  M. TURCHAN  2,745,624
THREE DIMENSION TRACER
Filed Feb. 25, 1953  3 Sheets-Sheet 3

INVENTOR.
MANUEL TURCHAN.
BY
Robert A. Sloman
ATTORNEY.

United States Patent Office 2,745,624
Patented May 15, 1956

2,745,624

THREE DIMENSION TRACER

Manuel Turchan, Dearborn, Mich.

Application February 25, 1953, Serial No. 338,840

15 Claims. (Cl. 251—3)

This invention relates to a three dimension tracer, and more particularly to a universal type tracer responsive to the shape and contour of a pattern for controlling the movements of three slide controlling cylinders at right angles to each other.

It is the object of the present invention to provide a novel tracer construction with the spindle projecting therefrom and responsive to the surface of a template or pattern for controlling within a tracer housing a pair of valves at right angles to each other for regulating the flow of pressure fluid to either end of a pair of slide controlling cylinders at right angles to each other.

It is the further object of the present invention to provide a hand operated tracer whereby the spindle thereof is manually disposed over or maintained in contact with various portions of a template or pattern whereby control movements of said spindle are adapted to effect the simultaneous control of three slide control cylinders arranged at right angles to each other.

It is the further object of the present invention to provide a novel tracer construction which is clearly simplified over prior structures for this purpose, and which is fully effective for the intended purpose.

These and other objects will be seen from the following specification and claims in conjunction with the appended drawing in which:

Figure 1:
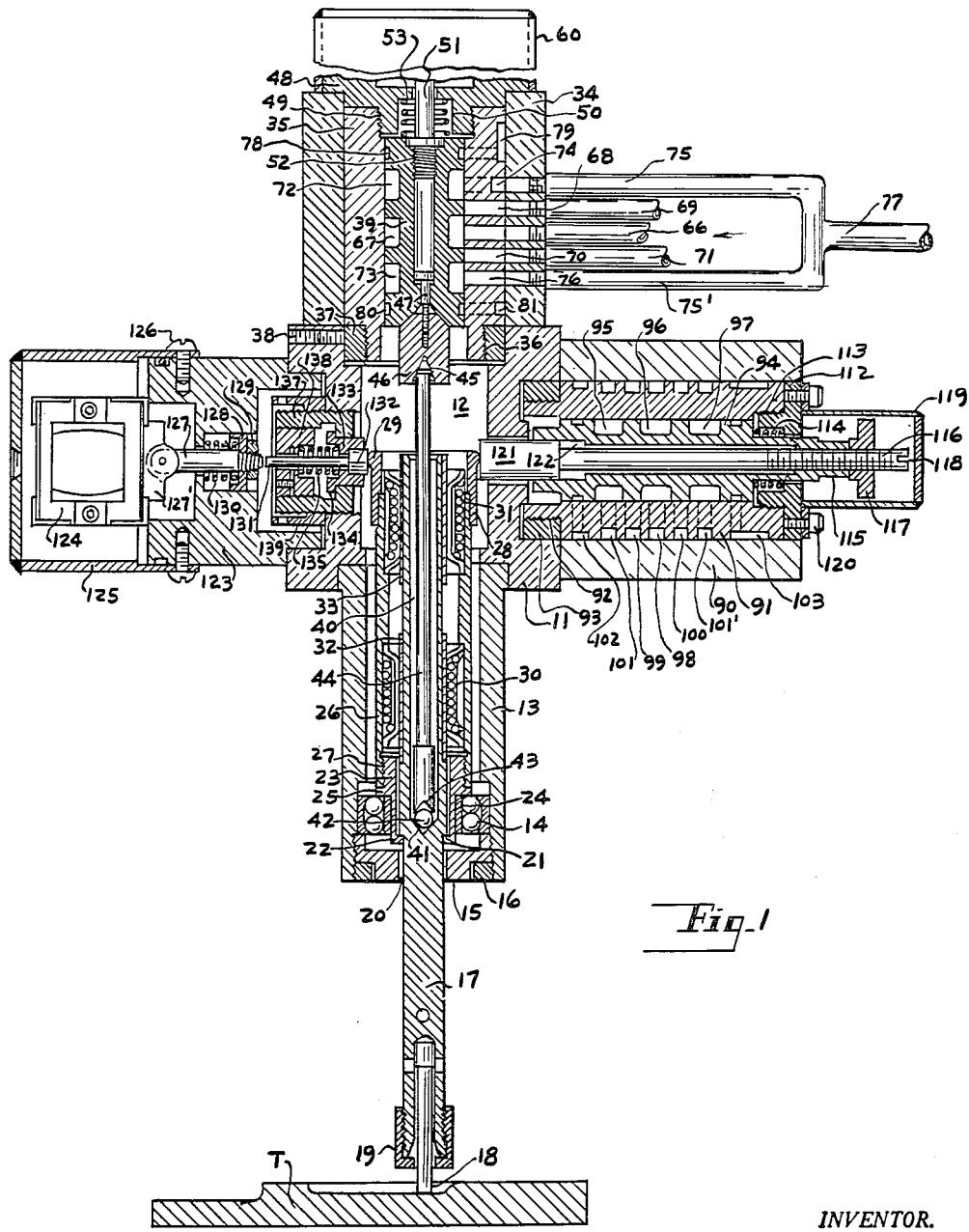
Fig. 1 is an elevational section of the three dimension tracer with a portion thereof fragmentarily shown.

It will be understood that the above drawings illustrate merely a preferred embodiment of the invention, and that other embodiments are contemplated within the scope of the claims hereafter set forth.

Referring to the drawings, the present three dimension tracer is a manually operated tracer in the sense that the tracer tip is manually traversed in any direction over the surface of the template T. The tracer tip while in engagement with said template responds to vertical variations in the surface of said template for effecting corresponding relative vertical movements of a cutting tool with respect to a workpiece by controlling the vertical movements of the knee 87, as shown diagrammatically in Fig. 4.

The tracer spindle is also universally mounted intermediate its ends within the tracer and tilting movements of the tracer tip in any direction in a horizontal plane are adapted to control a pair of valves within the tracer arranged at right angles to each other for regulating the flow of pressure fluid to either or both of a pair of slide controlling cylinders 108 and 148 for effecting relative movements at right angles to each other of a pair of additional slides 88 and 89, which are mounted upon the knee 87 in a conventional manner.

Referring to Fig. 1, the present tracer includes a central block 11 with a central cylindrical aperture 12 therein and with a depending tubular tracer body 13 joined thereto.

The spherical bearing, generally indicated at 14, provides a universal mounting for the tracer spindle 17 from the lower end of which depends tracer tip 18 secured thereto at 19.

Adjusting screw 15 threaded to the lower end of the tracer body 13 provides an adjustable support for the bearings 14, and is secured in adjusted position by the lock nut 16, said adjusting screw 15 being centrally apertured at 20 to loosely receive the depending spindle 17.

Spindle 17 intermediate its ends has a portion of increased diameter defining the annular shoulder 21, which is adapted to supportably rest upon the internal flange 22 of the supporting sleeve 23. Said sleeve has an exterior anngular flange 25 which rests upon the stationary race 24 of the bearings 14, whereby said spindle is universally mounted within the tracer body 13 at its lower end.

The upper end of the sleeve 23 is threadedly joined at 27 to the lower end of the guide tube 26; the upper end of said tube having suitably secured thereover the annular cup shaped control element 28, which has at its upper end the annular ridge 29 for operation in the manner hereafter described.

Within the tube 26 and spaced from each other are a pair of ball bushings 30 and 31 which cooperatively and slidably receive the hardened cylindrical elements 32 and 33 immovably secured to the upper portion of spindle 17, as shown in Fig. 1.

Cylindrical valve block 34 has immovably secured therein the valve sleeve 35, the lower extending threaded end 36 of which extends into the interiorly threaded washer 37, which is secured within the top of the tracer body 11 by a plurality of set screws 38.

There is provided within the sleeve 35 a vertically adjustable fluid control valve 39, which is responsive to vertical movements of the spindle 17 responsive to the surface of the template T, which vertical movements are adapted to control the flow of pressure fluid to the knee operating hydraulic cylinder 84 and the exhaust therefrom in the manner hereafter described.

The upper end of the spindle 17 has a central elongated bore 40 opening to the upper end of said spindle, the lower end of said bore having a conically shaped notch 41 supporting the ball 42.

Vertically adjustable control rod 44 has an inverted conical notch 43 at its lower end which engages over the ball 42 and is thereby adapted for transmitting vertical adjustments of the spindle 17 to the control valve 39.

Cylindrical block 46 has a conical opening 45 to receive the end of the control rod 44 which is positioned loosely within the bore 40 of the spindle 17 at the upper portion thereof. The block 46 is secured centrally to and in axial alignment with valve 39 by means of the threaded bolt 47, which depends from said valve and threadedly engages block 46.

The circular cap 48 is positioned over the top of the block 34 with a portion thereof extending thereinto over the upper end of the sleeve 35, said cap having a downwardly depending exteriorly threaded portion 49 which threadedly and adjustably engages the upper end of sleeve 35.

Cap 48 has an enlarged undercut recess 50 for housing the coiled spring 53, the lower end of which cooperatively bears against valve 39. The recess 50 terminates at its upper end in a central aperture of reduced dimension for loosely receiving the upright axially aligned valve stem 51, which threadedly engages the upper end of said valve at 52.

Figure 3:
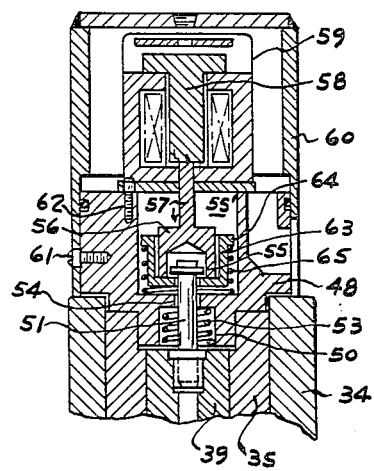
Fig. 3 is a fragmentary elevational section of the upper portion of the tracer shown in Fig. 1.

Fig. 1 is broken away at its upper end, and the remainder of that portion of the tracer construction is shown in Fig. 3.

Referring to Fig. 3, it appears that the recess 50 terminates in the aperture 54 and that the stem 51 extends therethrough, and carries a disc 55 at its upper end. Said disc is loosely positioned within a central undercut recess in the plunger 56 at the lower end of the shaft 57, which depends from the reciprocal core 58 of solenoid 59. Said solenoid has a cylindrical enclosure 60 which depends down over the cap 48 and is secured thereto by the transverse locking screws 61. Furthermore the solenoid 59 is secured to the cap 48 by a plurality of depending screws 62.

The plunger 56 extends loosely within the cup shaped element 63 and bears against the bottom surface thereof, said cup shaped element 63 being centrally apertured to loosely receive the valve stem 51. Said cup shaped element is adapted to cooperatively engage the undersurface of the disc 55 of the valve stem 51, and has an exterior annular flange 64 for cooperatively receiving the upper end of the coiled spring 65 which is positioned within the bore 55' of cap 48.

In normal operation and with the solenoid de-energized, the coil spring 65 is effective for upwardly positioning the cup shaped element 63, so as to suitably lift valve stem 51 for maintaining the valve 39 in such position of positive adjustment as will control the flow of pressure fluid to cylinder 84 to thereby effect a relative movement of the cutting tool employed away from the workpiece to prevent accidental damage thereto should the pump in the hydraulic unit 82 be accidentally started.

In other words, when the device is not in use the coiled spring 65, acts as a safety factor in maintaining the control valve 39 in a positive position of adjustment.

In operation when the device is started, the solenoid 59 is initially energized in any suitable fashion to effect a downward movement of the plunger assembly 57—56 thereby relieving the valve stem 51 from the upward pressure of the coiled spring 65. Thereafter the coiled spring 53, which is of less strength than spring 65, takes over and is effective to move the control valve 39 downwardly from the neutral central position shown in Fig. 1.

In the manner hereafter described this positioning of the valve so controls the flow of pressure fluid to cylinder 84 as will effect a relative vertical feeding of the cutting tool and the tracer tip 18 towards the workpiece and template T respectively. It is understood for the purpose of this application that the cutting tool and tracer body are so mounted as to move in unison, and that similarly the particular workpiece and template T will be secured to the top slide 89 for movements in unison.

Figure 4:
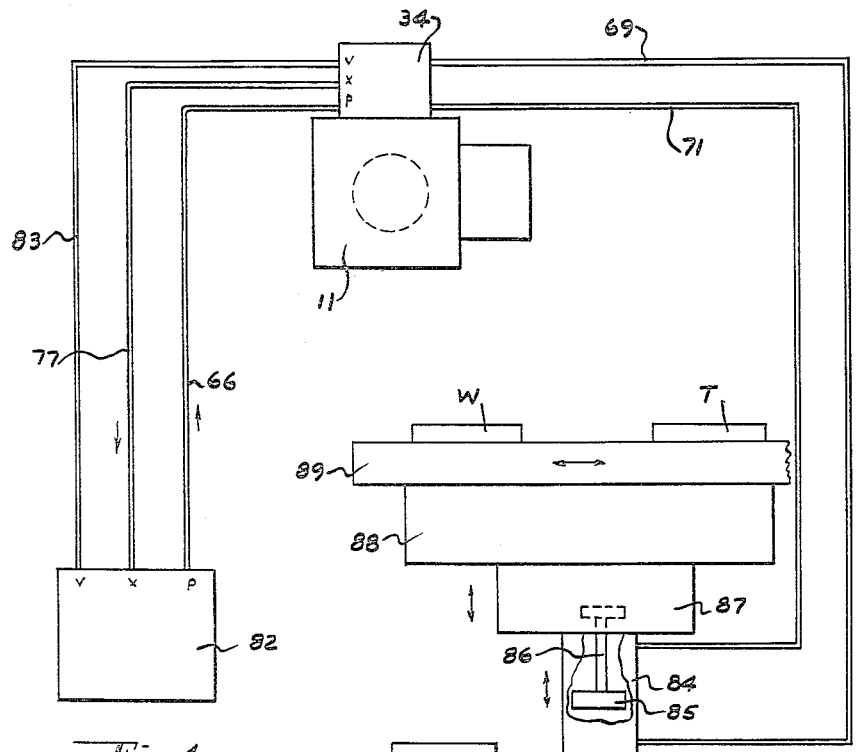
Fig. 4 is a diagrammatic illustration illustrating the relation of and fluid connections between the pressure fluid supply hydraulic unit, the tracer and the vertical slide controlling cylinder.

Referring to Figs. 1 and 4, there is provided a hydraulic unit 82 which contains a fluid sump and a pump for delivering fluid under pressure through conduit 66 through the valve block 34 and for passage through corresponding openings in said block and sleeve 35 for delivery to the central annular passage 67 in valve 39. Said valve, as shown in Fig. 1, is in a central or neutral position blocking off the flow of this pressure fluid to either end of cylinder 84. This neutral position corresponds to the tracer tip 18 engaging the template T or pattern with just sufficient lateral or longitudinal pressure as will maintain through spindle 17 and control rod 44, the valve 39 in the neutral position shown.

In operation, if the tracer tip is out of contact with the template, or on the other hand is moving over the surface of the template and enters a declivity or falling surface, the valve 39 under the action of the spring 53 will move below the central position shown in Fig. 1, several thousandths of an inch, three thousandths for illustration, so that valve opening 67 will be in communication with sleeve opening 70 and a registering passageway in block 34, permitting the flow of pressure fluid through the conduit 71 to one end of the cylinder 84. Assuming the cylinder 84 is vertically movable with respect to a stationary piston 85 and piston rod 86, this flow of pressure fluid will effect an upward movement of said cylinder 84 carrying with it the knee 87 and the two transversely and horizontally movable slides 88 and 89, upon which the workpiece W and template T are mounted. The upward movement will continue until the tracer tip 18 has re-established a pre-determined pressure relationship with the template, such as will re-position the valve 39 in the neutral position shown in Fig. 1, cutting off further flow of pressure fluid through conduit 71.

During the flow of pressure fluid through conduit 71 to the upper end of cylinder 84, it is obvious that there will be a return exhausting flow of fluid from the opposite end of said cylinder through conduit 69 returning said fluid to the block 34 and through the sleeve passage 68 and into the annular valve passage 72, which in said negative position is below the position shown in Fig. 1. This exhaust flow from passage 72 passes through sleeve passage 74 and through the block connecting exhaust conduit 75, and conduit 77, which returns said exhaust fluid to the hydraulic unit 82, in the manner shown in Fig. 4.

Should the tracer tip when traversing over the surface of the pattern or template encounter a rise in the surface thereof, this will effect an upward movement of the spindle 17, which will be transmitted through the ball 42 and rod 44 to the valve 39 moving the same above the neutral position shown in Fig. 1. This is a positive deflection.

In the position of the valve 39, the pressure fluid receiving passage 67 will be in communication with sleeve opening 68 and the cylindrical conduit 69 for delivering pressure fluid to the lower end of cylinder 84. This causes a downward movement of said cylinder which will continue until the pressure of contact between the tracer tip and the pattern is reduced to its original condition as will permit the valve 39 to return to its neutral position shown in Fig. 1, under the action of spring 53.

During this downward movement of cylinder 84, there will also be a flow of exhaust fluid from the upper end of said cylinder through the conduit 71 back to the block 34 and through sleeve passage 70, which will communicate with the annular valve opening 73, due to the elevation of valve 39 above referred to. The exhaust flow from passage 73 will then pass through sleeve passage 76 and exhaust pipe 75' for return through exhaust conduit 77 back to the hydraulic unit 82.

To prevent seepage of fluid down into the interior of the tracer body 11, there is provided adjacent opposite ends of the valve, a pair of annular passages 78 and 80 which are respectively in communication with the sleeve openings 79 and 81, and which are both connected to the vacuum line 83, Fig. 4, for returning this seepage to the hydraulic unit 82.

The present three dimension tracer is adapted to simultaneously control the movements of the cross slide 88 mounted on the knee 87, Fig. 4, as well as the longitudinal top slide 89 which carries the workpiece and template.

Figure 5:
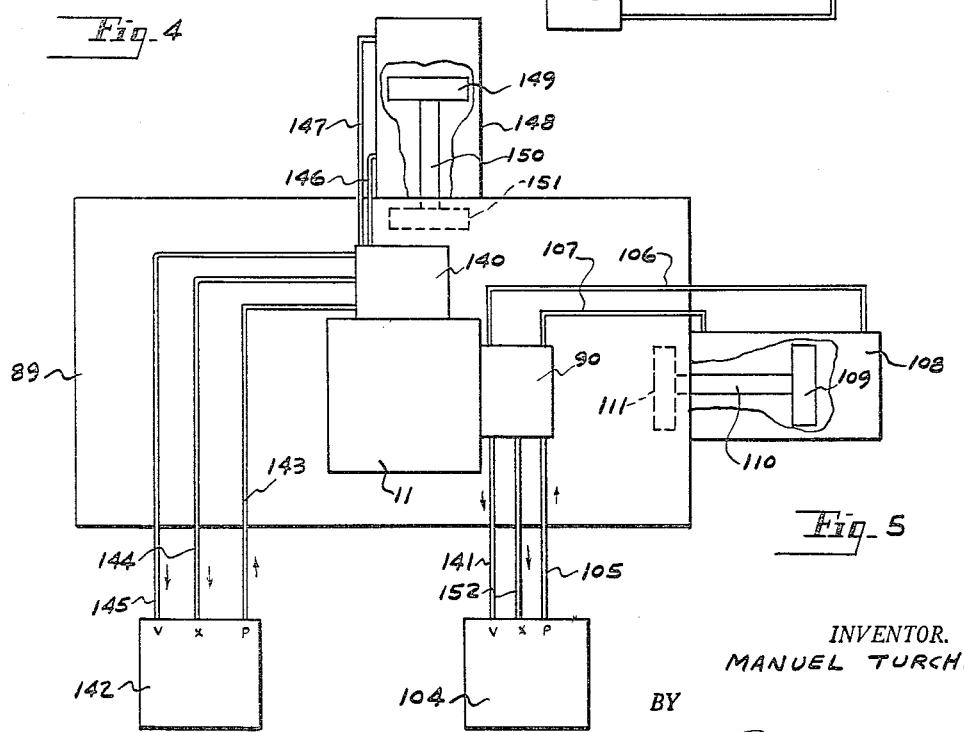
Fig. 5 is a diagrammatic view illustrating the relation and fluid connections between the hydraulic units, the tracer and two slide controlling cylinders.

The control of the movement of said slides is diagrammatically indicated in Fig. 5 and it will be noted that the reciprocal cross feed movements of slide 88 are controlled by hydraulic cylinder 148; on the other hand the reciprocal longitudinal movements of top slide 89 are controlled by hydraulic cylinder 108.

Figure 2:
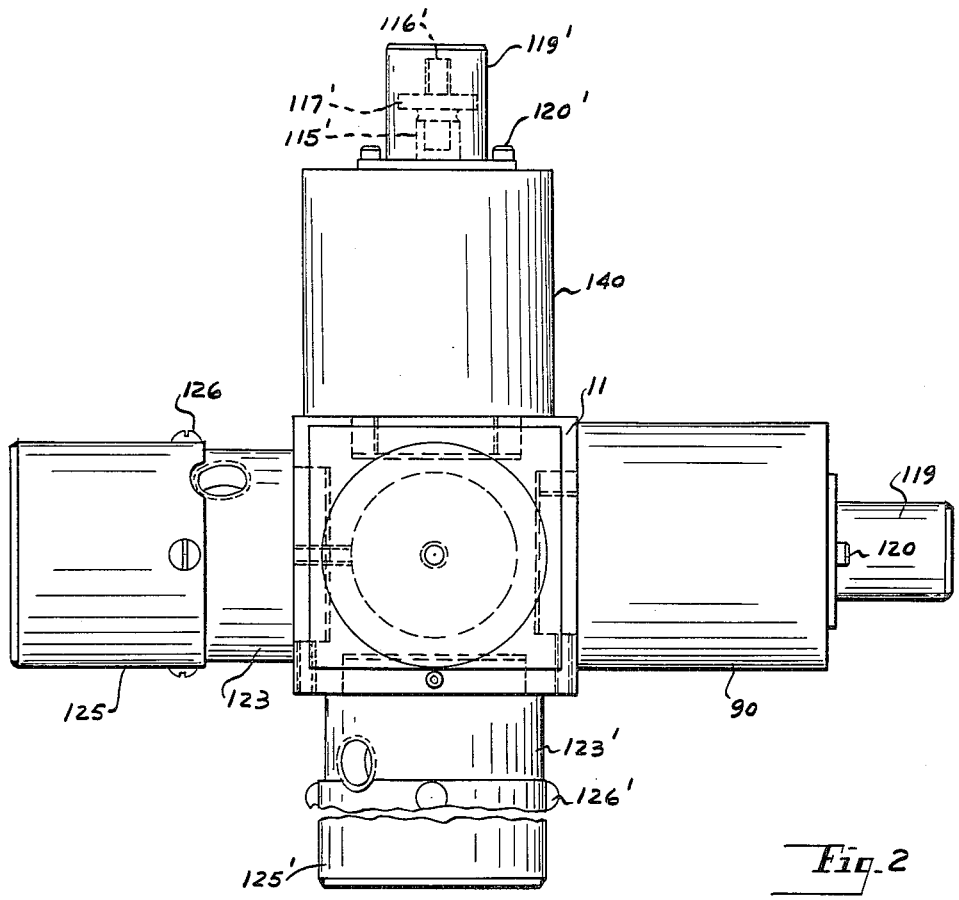
Fig. 2 is a plan view thereof with a portion thereof fragmentarily shown.

There is an identical and separate valve and control mechanism for operating the second hydraulic cylinder 148, as generally indicated in Fig. 2, however its structure will not be described in detail as it is the same as and operates the same as the control mechanism shown in Fig. 1.

Referring to Fig. 1, there is provided valve block 90 having secured therein the apertured sleeve 91, the left hand extension of which is threaded at 92 into the ring 93 suitably secured within a corresponding circular aperture upon one side of the tracer body 11.

Longitudinally reciprocal valve 94 having a plurality of longitudinally spaced annular passages 95, 96, 97, is adjustably positioned within said sleeve for controlling the flow of pressure fluid from the hydraulic unit 104, Fig. 5, to opposite ends of the top slide controlling cylinder 108, which is adapted to reciprocate with respect to stationary piston 109 and its piston rod 110 suitably anchored at 111 to the cross slide 88.

The sleeve 91 has a plurality of longitudinally spaced annular passages 98, 99, 100, 101, 101', 102' and 103 formed therein for facilitating the control and flow of pressure fluid in a manner substantially the same as that above described in conjunction with the operation of valve 39 within its sleeve 35.

Hydraulic unit 104 is similar to hydraulic unit 82 containing a fluid storage sump and a suitable power operated pump for delivering pressure fluid through conduit 105 to the block 90 for communication with sleeve passage 98. This passage has fluid communication with the central valve passage 96, and in the neutral position of valve 94 there will be no flow of this pressure fluid to either end of cylinder 108.

In operation, with the tracer tip 18 manually traversing the surface of the template or pattern, any positive or lateral deflection to the left of the template as shown in Fig. 1, transmitted through the spindle 17 and the bearing 14 will effect a corresponding control movement to the right of the control cap 28 for effecting movement to the right of the valve 94 from the neutral position, shown in Fig. 1.

Pressure fluid in valve opening 96 will then be in communication with the sleeve passage 100, which is joined by the conduit 106, which is joined to the outer end of cylinder 108. This will cause a movement to the right of cylinder 108 and top slide 89 and the template mounted thereon tending to reduce this increased pressure engagement with the tracer tip 18, which caused deflection thereof to thereby reduce the deflection of the spindle 17 and permit the same to return to the neutral position shown in Fig. 1, which will in turn cause the valve 94 to return to the neutral position shown in Fig. 1.

Under this above described positive deflection with pressure fluid flowing to the cylinder 108 through conduit 106 there would be a corresponding exhaust flow of fluid from cylinder 108 and through conduit 107 back to the block 90 for communication with the exhaust opening 99 in sleeve 94 for delivering this exhaust fluid to valve opening 95. Thence this exhaust fluid will flow through a suitable aperture in said sleeve communicating with sleeve opening 101, which in turn communicates with exhaust conduit 152 back to the hydraulic unit 104.

On the other hand should the tracer tip 18 in being manually traversed over the template enter a declivity, such as would permit a tilting of the tracer tip to the right, this movement through the spindle 17 and bearings 14 would permit a corresponding movement to the left of the control cap 28 and would permit a movement to the left of the valve 94, in the manner hereafter described, under the action of the coiled spring 114.

This movement to the left of valve 94 from the position shown in Fig. 1, would permit the pressure fluid in valve passage 96 to flow into the sleeve opening 99 and through the conduit 107 to the opposite end of cylinder 108 causing said cylinder to move to the left.

This movement to the left would cause a similar movement to the left of the template increasing the lateral pressure engagement thereof with the tracer tip 18 returning the same to the position shown in Fig. 1, in turn translating the control cap 28 in the opposite direction to again return valve 94 to the neutral position shown in Fig. 1.

Here also with the negative deflection of the tracer tip 18 causing flow of pressure fluid through pipe 107, there will be an exhaust return flow through conduit 106 to the block 90. This exhaust flow will enter sleeve passage 100 and valve passage 97 for communication with sleeve opening 101' for returning the exhaust fluid through the exhaust conduit 152 to hydraulic unit 104.

Any seepage towards the opposite ends of valve 94 will enter the outer annular passages adjacent the opposite ends of valve 94, which are in communication respectively with the sleeve openings 102 and 103. The exhaust pipe 141 connected to a vacuum producing means within the hydraulic unit 104, forming no part of the present invention, is connected at its opposite end to the sleeve openings 102 and 103 to thereby scavenge such seepage back to the hydraulic unit.

Referring to Fig. 1, sleeve 91 has a cap 112 which is threaded thereinto at 113, said cap having an undercut bore for receiving the spring 114, which bears against the right end of valve 94 tending to urge the same to the left.

Valve 94 has an extension 115 which is interiorly threaded to receive the valve stem 116, which is adjustably positioned through said valve and may be secured in any desired relative adjusted position by the lock nut 117. The stem 116 has a transverse screw driver receiving slot 118 upon the end thereof to permit rotary adjustment of said stem with respect to the valve 94 to thereby obtain the correct adjustment of said valve within its sleeve in setting up the device. This adjusting mechanism is enclosed within the hollow housing 119, which is secured to the end of the said sleeve by a plurality of screws 120.

Valve stem 116 has at its left end has a cylindrical piston 121 adjustably positioned within the bore 122 in valve 94. The outer end of piston 121 cooperatively engages and is biased against the annular ridge 29 of control cap 28 by the coiled spring 114, which acts upon the opposite end of valve 94. Consequently, tilting movements of the control cap 28 are adapted to control reciprocal control movements of valve 94 for regulating the flow of pressure fluid to opposite ends of cylinder 108 with the tracer tip 18 responding to certain changes in the surface of the template as the spindle 17 is manually traversed thereover.

Cylindrical block 123 is axially aligned with valve block 90 and secured at one end within a lateral opening in the valve body 11, as shown in Fig. 1. Solenoid 124 is secured upon the outer end of block 123 in the same manner as is solenoid 59 secured upon cap 48, and said solenoid is enclosed by the cylindrical cover 125 mounted over the outer end of block 123 and secured thereto by the screws 126.

Reciprocal plunger 127 on the movable armature 127' of solenoid 124 is arranged in substantial axial alignment with valve 94 and has mounted on its end spring retainer 128 secured thereon by the nut 129. Said retainer is slidably positioned within a central bore in the block 123, and coiled spring 130 is positioned within said bore bearing against said block at its one end and with the other end of said spring bearing against retainer 128, normally urging the same to the right.

Elongated pin 131 is axially aligned with plunger 127 and is adapted for engagement at one end with said plunger. The opposite end of said pin has an enlarged cylindrical head 132 which cooperatively engages the annular ridge 29 on the valve operator cup 28.

Head 132 is nested within a recess in the spring retainer 133, said retainer being slidably positioned within the longitudinally adjustable cylinder 137, which is exteriorly threaded and threadedly engages the body 11 in axial alignment with valve 94. Retainer 133 has an annular flange 134 which cooperates with an inturned annular flange upon one end of adjustable cylinder 137 for limiting the movement to the right of said retainer.

Coiled spring 135 bears against retainer 133 at one end of said spring, and the other end of said spring is received within a bore formed in the adjustable lock nut 138, whereby a spring pressure is maintained upon retainer 133 normally urging the same and its flange 134 into cooperative engagement with the cylinder 137. It is contemplated that the cylinder 137 is threadedly adjustable for securing the correct position of retainer 133 and the pin 131 together with its head 132, so that the spindle 17 and tube 26 is in a perfectly upright position when in neutral position or when out of contact with the template or pattern. Adjustable cylinder 137 is locked in the desired adjusted position by the lock nut 139, which threadedly engages said cylinder and bears against the body 11.

It is contemplated that spring 130 is stronger than spring 135 and consequently said spring 130 will be effective for maintaining the plunger 127 in contact with the end of pin 131 to thereby maintain the cup shaped actuator 28 in the neutral upright position, shown in Fig. 1.

When it is desired to utilize the tracing mechanism, the solenoid 124 will be electrically energized withdrawing the plunger 127 to the left, disengaging the same from the pin 131, so that said pin is free to move to the left of the position shown in Fig. 1, acting against only the coiled spring 135.

The tracer valve 94 within block 90 together with the stop 132 and the solenoid mechanism 124 comprises the control mechanism to certain tilting movements of the spindle and tube 26 for controlling the movements of cylinder 108 and the top slide 89 upon which the workpiece and template are mounted.

As indicated in the drawings, there is a second slide 88 which is a cross slide adapted for movements at right angles to the direction of movement of top slide 89. This slide is under the control of hydraulic cylinder 148 and the relatively stationary piston 149 and piston rod 150, which is secured at 151 to some portion of the vertically adjustable knee 87. Corresponding to block 90 there is a second block 140 arranged at right angles to block 90 and similarly secured to the tracer body 11. Said block contains a horizontally movable spring biased fluid control valve, which is identically the same as valve 94, Fig. 1, and operates in exactly the same manner as valve 94 for controlling the flow of pressure fluid from hydraulic unit 142 to opposite ends of cross slide controlling cylinder 148.

As shown in Fig. 5, hydraulic unit 142 contains a fluid sump and a power operated pump for delivering pressure fluid through conduit 143 to the valve block 140. Depending upon the positioning of the control valve within block 140 responsive to universal tilting movements of tube 26 and the operator 28, this pressure fluid will be delivered out through either of the conduits 146 or 147 selectively to opposite ends of cylinder 148. With pressure fluid delivered through one conduit, the exhaust flow from the opposite end of the cylinder returns to valve block 140 through the other conduit and is exhausted back to the hydraulic unit 142 through conduit 144.

Hydraulic unit 142 also has a vacuum producing device similar to that employed in hydraulic unit 82 whereby any seepage within the block 140 may be returned to said hydraulic unit through the conduit 145. The valve within the block 140 also has a valve stem with a piston element similar to piston 121, Fig. 1, engaging the operator 28. Consequently, it is contemplated as a part of the present invention that both of the hydraulic control valves at right angles to each other, and operating in a horizontal plane may be simultaneously controlling the flow of pressure fluid to both of the cylinders 108 and 148.

As shown in Fig. 2, it is apparent that the control valve within block 140 has an extension 115' and threaded thereto a valve stem 116' and a lock nut 117', all enclosed by a cap 119' secured to block 140 by the screws 120'.

Fig. 2 also illustrates a second solenoid mechanism 125' secured to block 123' by the screws 126', which construction is identical as that above described in Fig. 1.

Here also there is provided a spring biased stop mechanism exactly the same as above described with respect to elements 132, 133, 134, 135, 137, 138 and 139 of Fig. 1.

As the fluid control mechanism is identically the same as that described with respect to valve 94, Fig. 1, its detailed illustration and description is omitted.

In the operation of the present device all of the solenoid mechanism must be initially energized to place the tracer in proper operating condition. Thereafter the spindle 17 and its operator tip 18 is manually traversed over and in respect to the surface of the template T, and the responses of the tracer tip and spindle to changes in the contour of the template will effect operation of the two horizontally disposed fluid control valves arranged at right angles to each other within the tracer housing and will also effect a simultaneous action of the third control valve 39 arranged at right angles thereto.

The operator rod 44 within the spindle 17 and its bore 40 is so arranged that regardless of any tilting movements of spindle 17, the operator 44 will be maintained in a perfectly upright position. Thus the tilting movements of the spindle will not effect the knee controlling valve 39 unless there is some vertical change in the template.

It will be understood that while the solenoid mechanism above described is advantageous, nevertheless the present device will operate without it.

Having described my invention, reference should now be had to the claims which follow for determining the scope thereof.

I claim:

1. A control means for a pair of horizontally disposed spring biased first valves movable in a tracer housing at right angles to each other and for a third spring biased valve movable in said housing at right angles to the axial plane of the first valves; comprising a pattern engaging spindle having an elongated bore at one end universally mounted intermediate its ends within the lower end of said housing and projecting therefrom, an annular valve operator on the upper end of said spindle responsive to tilting movements of the spindle, and an upright valve control rod loosely mounted at one end within the bore of said spindle and projecting thereabove the lower end of said spindle being manually traversable over the surface of a pattern.

2. The control means of claim 1, the point of mounting of said rod being substantially coplanar with and centrally of the universal mounting of the spindle whereby said spindle may be universally tilted without vertically displacing said rod.

3. A control means for a pair of horizontally disposed spring biased first valves movable in a tracer housing at right angles to each other and for a third spring biased valve movable at right angles to the axial plane of the first valves; comprising an upright control tube loosely positioned within said housing and at its lower end universally mounted upon said housing, an annular valve operator on the upper end of said tube responsive to tilting movements of a spindle, an upright spindle having a longitudinal bore opening at its upper end supported upon and slidably disposed within said tube and projecting below said housing adapted for contacting and traversing the surface of a pattern, being vertically movable for effecting corresponding control movements and laterally movable for effecting universal tilting movements of said tube, and an upright valve control rod loosely positioned within the bore of said spindle and supported thereon.

4. The control means of claim 3, and longitudinally disposed bearings mounted upon the inner surface of said tube slidably receiving said spindle.

5. The control means of claim 3, said bore terminating at its lower end in an axial V notch, the lower end of said rod having an axial V notch, and a ball interposed between said notches whereby said rod will remain vertical regardless of the tilting movements of said spindle.

6. The control means of claim 3, and solenoid means normally maintaining said tube in an upright position and adapted to maintain said third valve in a positive upright controlling position, said solenoid means when energized adapted for releasing said tube and third valve for normal operation.

7. The control means of claim 3, and spring biased stops engaging the upper end of said operator normally maintaining said tube in an upright position.

8. The control means of claim 3, spring biased stops engaging the upper end of said operator normally maintaining said tube in an upright position, and solenoid means normally maintaining said stops in an immovable position and adapted to normally maintain said vertically movable valve in a position of positive displacement.

9. A control means for a pair of horizontally disposed spring biased valves movable in a tracer housing at right angles to each other; comprising a pattern engaging spindle having an elongated bore at one end universally mounted intermediate its ends within the lower end of said housing and projecting therefrom, an annular valve operator on the upper end of said spindle responsive to tilting movements of the spindle, a spring biased stop in said housing axially aligned with said spindle, and an upright control rod loosely mounted at one end within the bore of said spindle and projecting thereabove with its other end supportably engaging said stop.

10. A control means for a pair of horizontally disposed spring biased valves movable in a tracer housing at right angles to each other; comprising an upright control tube loosely positioned within said housing and at its lower end universally mounted upon said housing, an annular valve operator on the upper end of said tube responsive to tilting movements of the spindle, a spring biased stop in said housing axially aligned with said tube, an upright spindle having a longitudinal bore opening at its upper end and supported upon said tube and projecting below said housing adapted for contacting and traversing the surface of a pattern, being laterally movable for effecting universal tilting movements of said tube, and an upright control rod loosely positioned within the bore of said spindle and supported thereon, with the upper end of said rod supportably engaging said stop.

11. A control means for a pair of horizontally disposed spring biased valves movable in a tracer housing at right angles to each other; comprising an upright control tube loosely positioned within said housing and at its lower end universally mounted upon said housing, an annular valve operator on the upper end of said tube responsive to tilting movements of the spindle, an upright spindle supported upon, extending through and depending from said tube below said housing adapted for traversing the surface of a pattern, being laterally movable for effecting universal tilting movements of said tube, a coiled spring interposed between said housing and the upper end of said spindle, and solenoid means normally maintaining said tube in an upright position, said solenoid means when energized releasing said tube for normal operation.

12. A control means for a pair of horizontally disposed spring biased valves movable in a tracer housing at right angles to each other; comprising an upright control tube loosely positioned within said housing and at its lower end universally mounted upon said housing, an annular valve operator on the upper end of said tube responsive to tilting movements of the spindle, an upright spindle arranged axially of and depending from said tube below said housing adapted for traversing the surface of a pattern, being laterally movable for effecting universal tilting movements of said tube, and spring biased stops engaging said valve operator normally maintaining said tube in an upright position.

13. The control means of claim 12, and solenoid means normally maintaining said stops in an immovable position.

14. A control means for a pair of horizontally disposed spring biased valves movable in a tracer housing at right angles to each other; comprising a pattern engaging spindle universally mounted intermediate its ends within the lower end of said housing and projecting therefrom, an annular valve operator on the upper end of said spindle responsive to tilting movements of the spindle, an axial spring within said housing bearing against the upper end of said spindle, and solenoid means engaging said operator and normally maintaining said operator in an upright position, said solenoid means when energized releasing said operator for normal operation.

15. A control means for a pair of horizontally disposed spring biased valves movable in a tracer housing at right angles to each other; comprising a pattern engaging spindle universally mounted intermediate its ends within the lower end of said housing and projecting therefrom, an annular valve operator on the upper end of said spindle responsive to tilting movements of the spindle, spring biased stops engaging said operator normally maintaining said operator in an upright position, and solenoid means normally maintaining said stops in immovable position, said solenoid means when energized releasing said stops for normal operation.

References Cited in the file of this patent

UNITED STATES PATENTS

| | | |
|---|---|---|
| 2,332,532 | Roehm | Oct. 26, 1943 |
| 2,332,533 | Roehm | Oct. 26, 1943 |
| 2,433,005 | Turchan | Dec. 23, 1947 |
| 2,562,284 | Tancred | July 31, 1951 |